United States Patent
Tang

(10) Patent No.: US 11,014,236 B2
(45) Date of Patent: May 25, 2021

(54) COMBINED ROBOT AND CRUISE PATH GENERATING METHOD THEREOF

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 332 days.

(21) Appl. No.: 16/303,093

(22) PCT Filed: May 19, 2017

(86) PCT No.: PCT/CN2017/085030
§ 371 (c)(1),
(2) Date: Nov. 19, 2018

(87) PCT Pub. No.: WO2017/198209
PCT Pub. Date: Nov. 23, 2017

(65) Prior Publication Data
US 2019/0314987 A1    Oct. 17, 2019

(30) Foreign Application Priority Data
May 19, 2016 (CN) .......................... 201610339870.0

(51) Int. Cl.
*B25J 9/16* (2006.01)
*A47L 11/24* (2006.01)
(Continued)

(52) U.S. Cl.
CPC ............. *B25J 9/1664* (2013.01); *A47L 11/24* (2013.01); *A47L 11/4061* (2013.01); *G05D 1/0238* (2013.01); *A47L 2201/04* (2013.01)

(58) Field of Classification Search
CPC .. A47L 11/24; A47L 11/4061; A47L 2201/04; B25J 9/1664; B25J 11/0085;
(Continued)

(56) References Cited

U.S. PATENT DOCUMENTS

| | | | |
|---|---|---|---|
| 5,896,488 A | 4/1999 | Jeong | |
| 8,234,068 B1 * | 7/2012 | Young | G08G 5/0091 701/528 |

(Continued)

FOREIGN PATENT DOCUMENTS

| | | |
|---|---|---|
| CN | 101769754 A | 7/2010 |
| CN | 103092205 A | 5/2013 |

(Continued)

OTHER PUBLICATIONS

Chestnutt et al., Biped navigation in rough environments using on-board sensing, 2009, IEEE, p. 3543-3548 (Year: 2009).*

(Continued)

*Primary Examiner* — Mcdieunel Marc
(74) *Attorney, Agent, or Firm* — Maschoff Brennan

(57) ABSTRACT

A combined robot and a cruise path generating method thereof includes providing or generating a working map of a self-moving robot and marking a target point on the working map. A planned path is generated according to the location of the target point in the working map. The combined robot begins to walk according to the planned path and it is determined whether an obstacle is encountered during walking. If an obstacle is encountered, a different path adjustment mode is selected according to a relative location when the obstacle is encountered and the planned path is updated according to a walking path to form an actual path. Otherwise, the robot walks directly to form the actual path. The actual path is saved as a cruise path of the combined robot.

14 Claims, 3 Drawing Sheets

(51) Int. Cl.
*A47L 11/40* (2006.01)
*G05D 1/02* (2020.01)

(58) Field of Classification Search
CPC ...... B25J 9/163; G01C 21/00; G01C 21/3605; G01C 21/3697; G05D 1/02; G05D 1/0202; G05D 1/0238; G05D 1/0274; G05D 1/0088; G05D 1/0212; G05D 1/0061; G08G 5/0008; G08G 5/0039; G08G 5/0056; G08G 5/0069; G08G 5/0078; G08G 5/0086; G08G 5/0091; G08G 1/09626; G08G 5/0052; G08G 1/096741; G08G 1/096775; G08G 1/164; G06K 9/00805; G06K 2009/6213; G06K 9/3241; G06K 9/6201; G06K 9/6218; G06N 20/00; G06T 2207/30261; G06T 19/003; H04W 4/38; H04W 88/02; B64C 2201/141; B60H 1/00735; B60N 2/0224; B60P 3/0255; B60Q 5/005; B60R 11/04; B60R 2011/0003; E05F 15/73; E05F 2015/767; G07C 5/008; A42B 3/046; A63B 2220/803; A63B 2220/806
See application file for complete search history.

(56) References Cited

U.S. PATENT DOCUMENTS

| | | | | |
|---|---|---|---|---|
| 9,227,632 | B1* | 1/2016 | Lee | B60W 30/0953 |
| 9,229,453 | B1* | 1/2016 | Lee | B60W 30/12 |
| 10,816,993 | B1* | 10/2020 | Tran | G06N 3/0454 |
| 2011/0054689 | A1 | 3/2011 | Nielsen et al. | |
| 2012/0189507 | A1 | 7/2012 | Ko | |
| 2012/0239191 | A1 | 9/2012 | Versteeg et al. | |
| 2015/0355639 | A1 | 12/2015 | Versteeg et al. | |
| 2016/0088755 | A1 | 3/2016 | Lee et al. | |
| 2016/0357187 | A1* | 12/2016 | Ansari | G01S 13/862 |
| 2016/0357188 | A1* | 12/2016 | Ansari | G06K 9/00805 |
| 2016/0357262 | A1* | 12/2016 | Ansari | G06Q 10/0833 |
| 2016/0358477 | A1* | 12/2016 | Ansari | G06Q 30/0251 |
| 2020/0290742 | A1* | 9/2020 | Kumar | B64D 27/02 |

FOREIGN PATENT DOCUMENTS

| | | |
|---|---|---|
| CN | 103576686 A | 2/2014 |
| CN | 204631616 U | 9/2015 |
| CN | 105433878 A | 3/2016 |
| EP | 3000369 A1 | 3/2016 |
| ES | 2554381 T3 | 12/2015 |
| JP | 2004-033340 A | 2/2004 |

OTHER PUBLICATIONS

Chestnutt et al., Footstep Planning for the Honda ASIMO Humanoid, 2005, IEEE, p. 629-634 (Year: 2005).*

Ayaz et al., Planning footsteps in obstacle cluttered environments, 2009, IEEE, p. 156-161 (Year: 2009).*

Elmogy et al., Online motion planning for HOAP-2 humanoid robot navigation, 2009, IEEE, p. (Year: 2009).*

Europeam Search Report in Application No. 17798772.4 dated Jul. 18, 2019.

An Office Action in Application No. 201610339870.0 dated Jun. 25, 2018.

An Office Action in Application No. 201610339870.0 dated Mar. 11, 2019.

* cited by examiner

COMBINED ROBOT AND CRUISE PATH GENERATING METHOD THEREOF

FIELD

The present disclosure relates to a combined robot and a cruise path generating method thereof.

BACKGROUND

A self-moving robot can be used for its convenient control and flexible action. However, the functionality of some other self-moving robots is simple, which can be problematic or insufficient for user needs that may include high intelligence, multiple functions, and high efficiency of the self-moving robot.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Description of Example Embodiments. This Summary is not intended to identify key features or essential characteristics of the claimed subject matter, nor is it intended to be used as an aid in determining the scope of the claimed subject matter.

Aspects of the present disclosure are directed to a combined robot. Because the combined robot is constructed by coupling the self-moving robot with one or more functional module(s), the height of the self-moving robot may be increased. A walking path of the combined robot is generally an optimal path computed and planned based on a working map, which is formed based on movement and scanning of the self-moving robot in a working environment. Because the height of the combined robot is greater than the height of the self-moving robot, when the combined robot walks according to the previous optimal path, the combined robot may not pass through various types of places due to the change of the height or size of an actual environment or the occurrence of a temporary obstacle. Additionally or alternatively, if the functional module coupled with the self-moving robot needs special elements for a working region, such as a security module, the work control over various regions cannot be realized through a mode of walking according to the optimal path. Therefore, it may be desirable to develop a cruise path generating method suitable for the combined robot.

Accordingly, a combined robot and a cruise path generating method thereof, in view of the defects of other applications, is set forth in the present disclosure. A planned path is updated through manual adjustment for the planned path according to an actual path formed by obstacle avoidance during walking, and a final walking path for the combined robot is generated in a mode of combination of multiple paths, thereby helping to ensure more effective, reliable and convenient walking of the combined robot and increased working efficiency.

Some example problems solved by the present disclosure may be achieved through the following example elements:

A cruise path generating method for a combined robot is provided. The combined robot includes a self-moving robot and a functional module coupled with the self-moving robot. The method includes example steps, such as:

step 100: providing or generating a working map of the self-moving robot;

step 200: marking a target point on the working map;

step 300: planning an operating path from a starting point to the target point according to the location of the target point in the working map to generate a planned path;

step 400: the combined robot beginning to walk in accordance with the planned path, and determining whether an obstacle is encountered during walking or not; if so, adjusting the path and updating the planned path according to a walking path to form an actual path; otherwise, directly walking to form the actual path; and step 500: saving the actual path as a cruise path of the combined robot.

In these or other embodiments, a user may control the combined robot through a user terminal, and when the obstacle is encountered in the step 400, the adjusting the path may include:

step 410: determining whether the obstacle is a front obstacle or not; if so, the combined robot being stopped and switched to user operation for obstacle avoidance, and after completing the obstacle avoidance, the combined robot continuing to walk towards the target point; otherwise, entering step 420; and step 420: determining whether the obstacle is a side obstacle or not; if so, the combined robot conducting fine adjustment automatically, and after completing the fine adjustment, the combined robot continuing to walk towards the target point; otherwise, directly walking to form the actual path.

Further, the continuing to walk towards the target point in the step 410 may include: obtaining a current location of the combined robot after successful obstacle avoidance through manual operation of the user, and the combined robot computing an optimal path for returning to the planned path from the current location and returning to the planned path to continue to walk according to a walking direction of the optimal path.

Additionally or alternatively, the continuing to walk towards the target point in the step 410 may include: the location of the combined robot after successful obstacle avoidance through manual operation of the user being a current location, and the combined robot computing an optimal path from the current location to the target point and continuing to walk towards the target point according to a walking direction of the optimal path.

When the combined robot is equipped with a user terminal, the step 100 further includes sending the provided or generated working map to the user terminal for retention, and the user controlling the combined robot through the user terminal.

In addition, the planning an operating path from a starting point to the target point in the step 300 further includes: generating an optimal path; manually determining whether the optimal path should be modified by the user or not; if so, entering step 400 after the user directly adjusts the path on the terminal; otherwise, directly entering step 400.

In some embodiments, for the convenience of control, an application program for controlling and adjusting the walking path of the combined robot is correspondingly provided on the user terminal; and the planning the operating path from the starting point to the target point in the step 300 further includes: planning the path by the user by drawing directly on a display of the user terminal. In these or other embodiments, the optimal path may be a shortest path, a safest path, or some other suitable path.

In addition, in the step 410, before the combined robot is stopped and switched to user manual operation for obstacle avoidance, an alarm is given to remind the user that walking along the optimal path is interrupted. In these or other embodiments, the obstacle in the step 400 may be a temporary obstacle.

The present disclosure also provides a combined robot. The combined robot includes a self-moving robot and a functional module coupled with the self-moving robot. A storage unit is provided on the self-moving robot or the functional module. A working mode of the combined robot includes an uncombined mode and a combined mode. When the self-moving robot works individually or alone, the combined robot is in the uncombined mode; and when the self-moving robot is coupled with the functional module, the combined robot is in the combined mode. In the uncombined mode, a working map of the self-moving robot is provided or generated; a target point is marked on the working map; and an operating path from a starting point to the target point is planned according to the location of the target point in the working map to generate a planned path. In the combined mode, the combined robot walks in the working region according to the planned path, encounters an obstacle during walking, updates the planned path after adjustment and obstacle avoidance, and saves the updated planned path into the storage unit and forms a cruise path.

The combined robot also includes a user terminal configured to conduct information interaction with the combined robot. When the combined robot encounters the obstacle during walking, the user conducts adjustment and obstacle avoidance through the user terminal.

According to different needs of the user, the functional module may include one or more submodules of a security module, a humidification module and a purification module.

For the convenience of operation, the user terminal includes a mobile device, a remote controller or a tablet personal computer capable of being in wireless communication with the combined robot.

In embodiments of the present disclosure, the self-moving robot is a sweeping robot.

In conclusion, the present disclosure provides a combined robot and a cruise path generating method thereof. The planned path is updated through manual adjustment for the planned path according to the actual path formed by obstacle avoidance during walking, and a final walking path for the combined robot is generated in a mode of combination of multiple paths, thereby helping to ensure more effective, reliable and convenient walking of the combined robot and increased working efficiency.

BRIEF DESCRIPTION OF THE DRAWINGS

Aspects of the present disclosure are described below in detail in combination with the drawings and various example embodiments.

DETAILED DESCRIPTION OF EXAMPLE EMBODIMENTS

Figure 1:
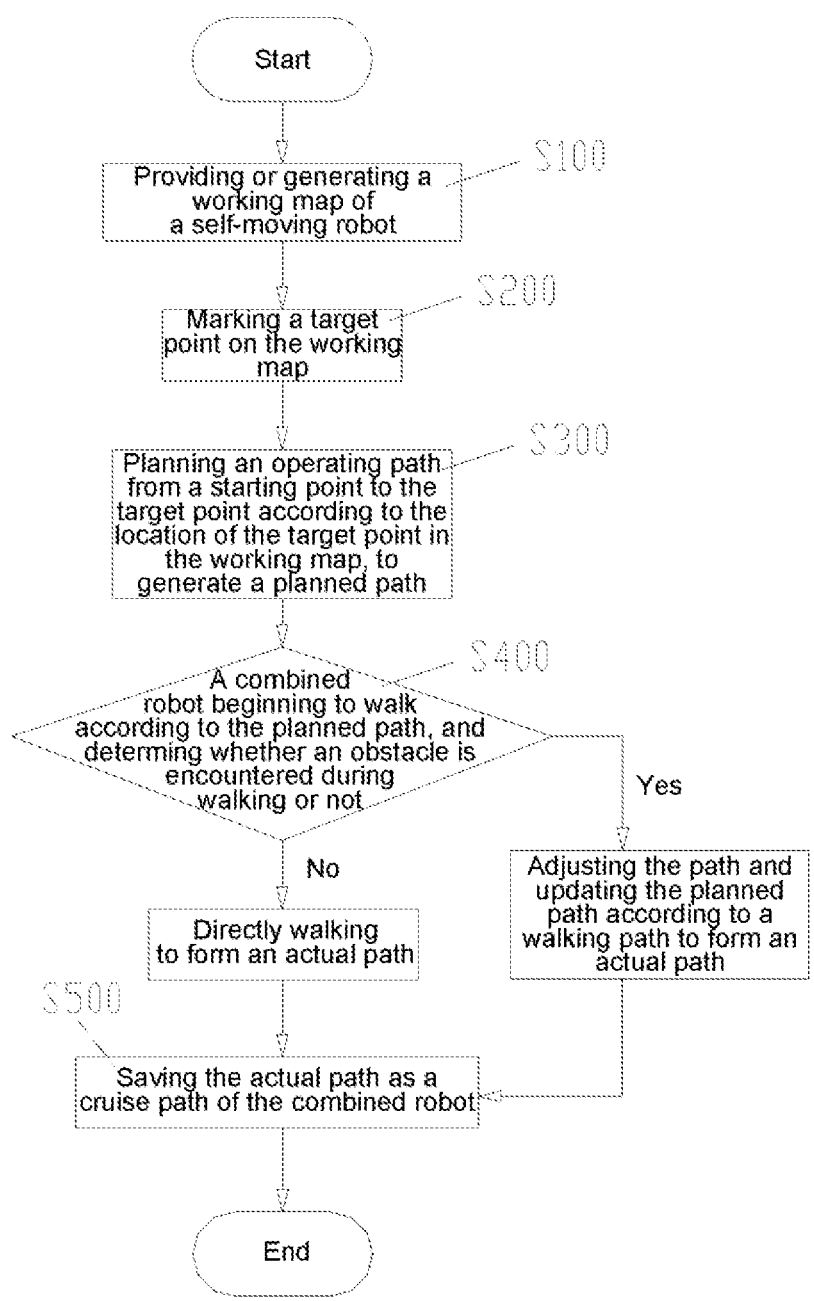
FIG. 1 is a flow chart of a cruise path generating method for a combined robot provided by an embodiment of the present disclosure.

FIG. 1 is a flow chart of a cruise path generating method for a combined robot. As referred to in the present disclosure, the cruise path does not mean that the combined robot necessarily has a cruise function. Rather, the cruise path may include a new walking path capable of being called repeatedly. The combined robot includes a self-moving robot and a functional module coupled with the self-moving robot. Additionally or alternatively, the cruise path generating method for the combined robot includes the following steps:

step 100: providing or generating a working map of the self-moving robot;

step 200: marking a target point on the working map;

step 300: planning an operating path from a starting point to the target point according to the location of the target point in the working map, to generate a planned path; and the robot further receives the planning path.

step 400: the combined robot beginning to walk in accordance with the planned path, and determining whether an obstacle is encountered during walking or not; if so, adjusting the path and updating the planned path according to a walking path to form an actual path; otherwise, directly walking to form the actual path; and step 500: saving the actual path as a cruise path of the combined robot.

In some embodiments, for the convenience of operation, a user may control the combined robot through a user terminal, and when the obstacle is encountered in the step 400, the adjusting the path may include:

step 410: determining whether the obstacle is a front obstacle or not; if so, the combined robot being stopped and switched to user operation for obstacle avoidance, and after completing the obstacle avoidance, the combined robot continuing to walk towards the target point; otherwise, entering step 420; and/or step 420: determining whether the obstacle is a side obstacle or not; if so, the combined robot conducting fine adjustment automatically, and after completing the fine adjustment, the combined robot continuing to walk towards the target point; otherwise, directly walking to form the actual path.

Further, the continuing to walk towards the target point in the step 410 may include: the location of the combined robot after successful obstacle avoidance through manual operation of the user being a current location, and the combined robot computing an optimal path for returning to the planned path from the current location and returning to the planned path to continue to walk according to a walking direction of the optimal path.

Additionally or alternatively, the continuing to walk towards the target point in the step 410 may include: obtaining a current location of the combined robot after successful obstacle avoidance through manual operation of the user, and the combined robot computing an optimal path from the current location to the target point and continuing to walk towards the target point according to a walking direction of the optimal path.

When the combined robot is equipped with a user terminal, the step 100 further includes sending the provided or generated working map to the user terminal for retention, and the user controlling the combined robot through the user terminal.

In addition, the planning an operating path from a starting point to the target point in the step 300 further includes: generating an optimal path; manually determining whether the optimal path should be modified by the user or not; if so, entering step 400 after the user directly adjusts the path on the terminal; otherwise, directly entering step 400.

In some embodiments, for the convenience of control, an application program for controlling and adjusting the walking path of the combined robot is correspondingly provided on the user terminal; and the planning the operating path from the starting point to the target point in the step 300 further includes: planning the path by the user by drawing directly on a display of the user terminal. In these or other embodiments, the optimal path may be a shortest path, a safest path, or some other suitable path.

In addition, in the step 410, before the combined robot is stopped and switched to user manual operation for obstacle avoidance, an alarm is given to remind the user that walking along the optimal path is interrupted. In these or other embodiments, the obstacle in the step 400 may be a temporary obstacle.

Figure 2:
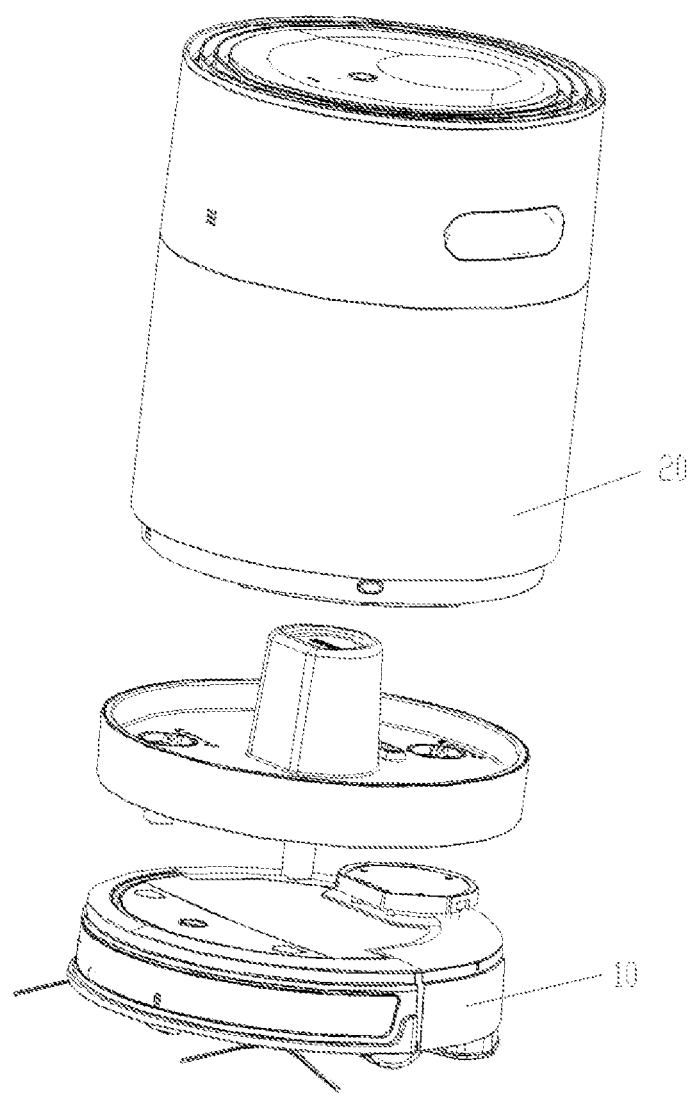
FIG. 2 is an entire structural schematic diagram of a combined robot provided by an embodiment of the present disclosure.

FIG. 2 is an entire structural schematic diagram of a combined robot. As shown in FIG. 2, an embodiment of the present disclosure also provides a combined robot A. The combined robot includes a self-moving robot 10 and a functional module 20 coupled with the self-moving robot 10. A storage unit (not shown in the figure) is provided on the self-moving robot 10 or the functional module 20. A working mode of the combined robot includes an uncombined mode and a combined mode. When the self-moving robot works individually or alone, the combined robot is in the uncombined mode; and when the self-moving robot is coupled with the functional module, the combined robot is in the combined mode. In the uncombined mode, a working map of the self-moving robot is provided or generated; a target point is marked on the working map; an operating path from a starting point to the target point is planned according to the location of the target point in the working map to generate a planned path. In the combined mode, the combined robot walks in the working region according to the planned path, encounters an obstacle during walking, updates the planned path after adjustment and obstacle avoidance, and saves the updated planned path into the storage unit and forms a cruise path.

The combined robot also includes a user terminal capable of conducting information interaction with the combined robot. When the combined robot encounters the obstacle during walking, the user may conduct adjustment and obstacle avoidance through the user terminal.

In these or other embodiments, according to different needs of the user, the functional module 20 may be one submodule or a combination of more submodules of a security module, a humidification module and a purification module.

In some embodiments, for the convenience of operation, the user terminal includes a mobile device, a remote controller or a tablet configured to communicate with the combined robot wirelessly.

In embodiments of the present disclosure, the self-moving robot 10 may be a sweeping robot.

Figure 3:
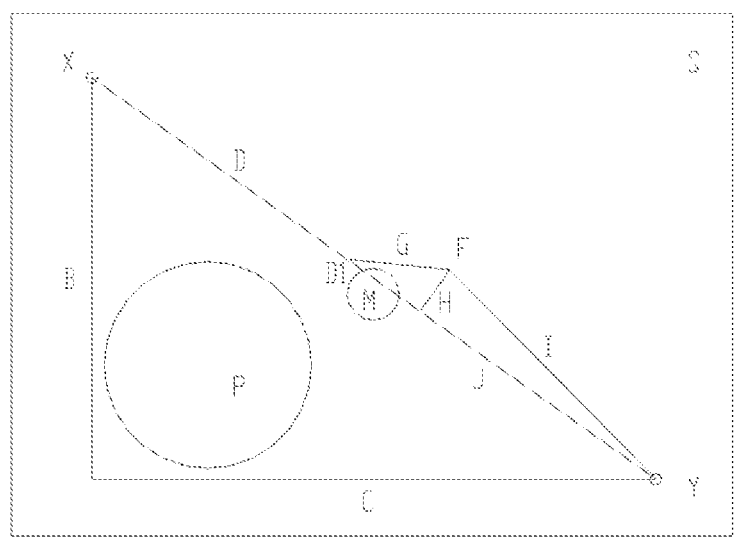
FIG. 3 is a schematic diagram of a walking path of a combined robot provided by an embodiment of the present disclosure.

FIG. 3 is a schematic diagram of an example walking path of a combined robot. As shown in FIG. 1, FIG. 2 and FIG. 3, the working process of the present disclosure is described below in detail in combination with specific embodiments.

As shown in FIG. 3, a working environment of a combined robot A is a room S, and components comprising the combined robot A include the sweeping robot, the humidification module, and the security module coupled to the sweeping robot. The combined robot A may be asked to complete a task of moving from point X to point Y for humidification along a diagonal of the room S, for example, along a planned path D computed according to a working map saved by the sweeping robot. When the combined robot A arrives at location D1, the combined robot A cannot pass through an obstacle M due to a height issue. Additionally or alternatively, the user remotely controls the combined robot A through a terminal for obstacle avoidance. The combined robot A is controlled to move to point F along the path G. At this moment, the combined robot A successfully avoids the obstacle M. Then, the combined robot A continues to walk to point Y from point F through two modes: the first mode is that a shortest distance for returning to the planned path D from the current point F is computed, namely, the combined robot A returns along an path H and then continues to complete the walking towards point Y along the planned path D; and the second mode is that a distance from the current point F to point Y is directly computed, and the combined robot A walks to point F according to an actual path I. Thus, in some embodiments, the cruise path of the combined robot A may include the path D, the path G and the path I, or may include the path D, the path G, the path H and the path J. Additionally or alternatively, the room S may include a recreation corner P for children. The user may instruct the combined robot A to start the security module during humidification, so as to monitor whether the children in the recreation corner P are safe or not. The planned path D may be manually drawn or dragged directly into the path B and the path C through the application program provided in the user terminal. The security of the children is monitored during humidification of the room S. The cruise path includes segment B and segment C.

Thus, in some embodiments, the cruise path generating method for the combined robot provided by the present disclosure is completed based on the self-moving robot 10 capable of mapping. Based on the working map established by the self-moving robot 10, the walking path of the combined robot is set according to the location need of the target point. The combined robot not only can automatically generate the planned path, but also can manually draw the path on the mobile device linked with the combined robot by the user. In any case, the user may modify the existing path on the mobile device. Based on this, when the combined robot encounters the obstacle when walking and moving according to the planned path, the user may manually control the combined robot to avoid the obstacle and automatically generate a new path through a remote control mode. The walking path of the combined robot is formed by a final path formed by one of or a combination of more paths, and then is saved and recorded. The combined robot may then cruise in the working environment according to the walking path.

Thus, in some embodiments, the present disclosure provides a combined robot and a cruise path generating method thereof. The planned path is updated through manual adjustment for the planned path according to the actual path formed by obstacle avoidance during walking, and a final walking path for the combined robot is generated in a mode of combination of multiple paths, thereby helping to ensure more effective, reliable and convenient walking of the combined robot and increased working efficiency.

Correspondingly, an embodiment of the present disclosure may also include a computer-readable storage medium that stores a computer program. The computer program, when executed by a computer, can implement the blocks (e.g., elements, steps, functions, etc.) with respect to the self-propelled robot path planning method of the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to", the term "having" should be interpreted as "having at least", the term "includes" should be interpreted as "includes, but is not limited to" etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B".

Additionally, the use of the terms "first", "second", "third" etc., are not necessarily used in the present disclosure to connote a specific order or number of elements. Generally, the terms "first", "second", "third" etc., are used to distinguish between different elements as generic identifiers. Absence a showing that the terms "first", "second", "third," etc., connote a specific order, these terms should not be understood to connote a specific order. Furthermore, absence a showing that the terms first", "second", "third" etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A cruise path generating method for a combined robot, the combined robot comprising a self-moving robot and a functional module coupled with the self-moving robot, wherein the combined robot walks in a working region, and the functional module includes one or more submodules including a security module, a humidification module and a purification module, the cruise path generating method comprising:
   providing or generating a working map of the working region of the self-moving robot;
   marking a target point on the working map;
   planning an operating path from a starting point to the target point according to a location of the target point in the working map to generate a planned path;
   the combined robot beginning to walk in accordance with the planned path, and determining whether an obstacle is encountered during walking;
   if the obstacle is encountered during walking, adjusting a path and updating the planned path according to a walking path to form an actual path; or
   if the obstacle is not encountered during walking, directly walking to form the actual path; and
   saving the actual path as a cruise path of the combined robot.

2. The cruise path generating method according to claim 1, wherein when the obstacle is encountered, adjusting the path comprises:
   determining whether the obstacle is a front obstacle;
   if the obstacle is the front obstacle, the combined robot being stopped and switched to user operation for obstacle avoidance, and after completing the obstacle avoidance, the combined robot continuing to walk towards the target point;
   if the obstacle is not the front obstacle, determining whether the obstacle is a side obstacle:
   if the obstacle is the side obstacle, conducting fine adjustment automatically, and after completing the fine adjustment, the combined robot continuing to walk towards the target point; or
   if the obstacle is not the side obstacle, directly walking to form the actual path.

3. The cruise path generating method according to claim 2, wherein the combined robot being stopped and switched to user operation for obstacle avoidance, and after completing the obstacle avoidance, the combined robot further comprises:
   locating a current location of the combined robot after successful obstacle avoidance through manual operation of the user; and
   the combined robot computing an optimal path for returning to the planned path from the current location and returning to the planned path to continue to walk according to a walking direction of the optimal path.

4. The cruise path generating method according to claim 3, wherein the optimal path is a shortest path.

5. The cruise path generating method according to claim 2, wherein the combined robot being stopped and switched to user operation for obstacle avoidance, and after completing the obstacle avoidance, the combined robot continuing to walk towards the target point further comprises:
   locating a current location of the combined robot after successful obstacle avoidance through manual operation of the user; and
   the combined robot computing an optimal path from the current location to the target point and continuing to walk towards the target point according to a walking direction of the optimal path.

6. The cruise path generating method according to claim 2, wherein, before the combined robot is stopped and switched to user manual operation for obstacle avoidance, an alarm is given to remind the user that walking along an optimal path is interrupted.

7. The cruise path generating method according to claim 1, wherein when the combined robot is equipped with a user terminal, providing and generating a working map of the self-moving robot further comprises:
   sending the provided or generated working map to the user terminal for retention; and
   the user controlling the combined robot through the user terminal.

8. The cruise path generating method according to claim 7, wherein planning an operating path from a starting point to the target point according to a location of the target point in the working map to generate a planned path further comprises:
   generating an optimal path; and
   determining whether the optimal path should be modified by the user:
   if the optimal path should be modified by the user, the user directly adjusts the path on the terminal.

9. The cruise path generating method according to claim 7, wherein:
   an application program for controlling and adjusting the walking path of the combined robot is correspondingly provided on the user terminal; and
   planning an operating path from a starting point to the target point according to a location of the target point in the working map to generate a planned path further comprises planning the path by the user by drawing directly on a display of the user terminal.

10. The cruise path generating method according to claim 1, wherein the obstacle is a temporary obstacle.

11. A combined robot comprising:
   a self-moving robot and a functional module coupled with the self-moving robot; wherein the combined robot walks in a working region, and the functional module includes one or more submodules including a security module, a humidification module and a purification module;
   a storage unit provided on the self-moving robot or the functional module; and
   a working mode of the combined robot comprising an uncombined mode and a combined mode, wherein:
   when the self-moving robot individually works, the combined robot is in the uncombined mode, and when the self-moving robot is coupled with the functional module, the combined robot is in the combined mode;
   in the uncombined mode, the self-moving robot establishes a working map for the working region, stores the working map in the storage unit and sends the working map to a user terminal for retention; and
   in the combined mode, the combined robot walks in the working region according to a planned path, and when the combined robot encounters an obstacle during walking, the combined robot updates the planned path after adjustment and obstacle avoidance, saves the updated planned path into the storage unit and forms a cruise path.

12. The combined robot according to claim 11, wherein:
   the combined robot further comprises a user terminal configured to conduct information interaction with the combined robot; and
   when the combined robot encounters the obstacle during walking, the user conducts adjustment and obstacle avoidance through the user terminal.

13. The combined robot according to claim 11, wherein the user terminal comprises a mobile device, a remote controller, or a tablet personal computer configured to be in wireless communication with the combined robot.

14. The combined robot according to claim 11, wherein the self-moving robot is a sweeping robot.

* * * * *